May 21, 1929.  S. H. SHARPSTEEN  1,714,321
MOTOR AND MOTOR SWITCH FOR FLASHERS AND THE LIKE
Original Filed Oct. 28, 1924   3 Sheets-Sheet 1

WITNESSES
Edw. Thorpe
A. L. Kitchin

INVENTOR
S. H. Sharpsteen
BY
ATTORNEYS

May 21, 1929.     S. H. SHARPSTEEN     1,714,321
MOTOR AND MOTOR SWITCH FOR FLASHERS AND THE LIKE
Original Filed Oct. 28, 1924    3 Sheets-Sheet 2
Fig. 3,
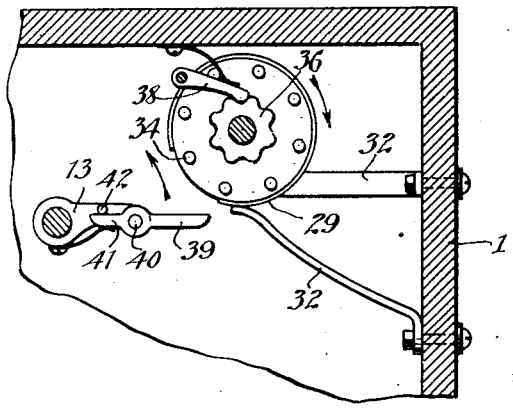
Fig. 4.
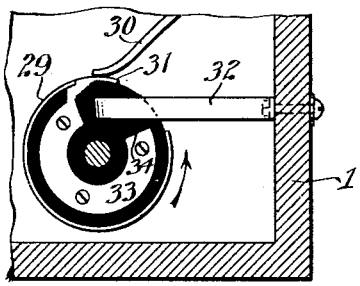
Fig. 5,
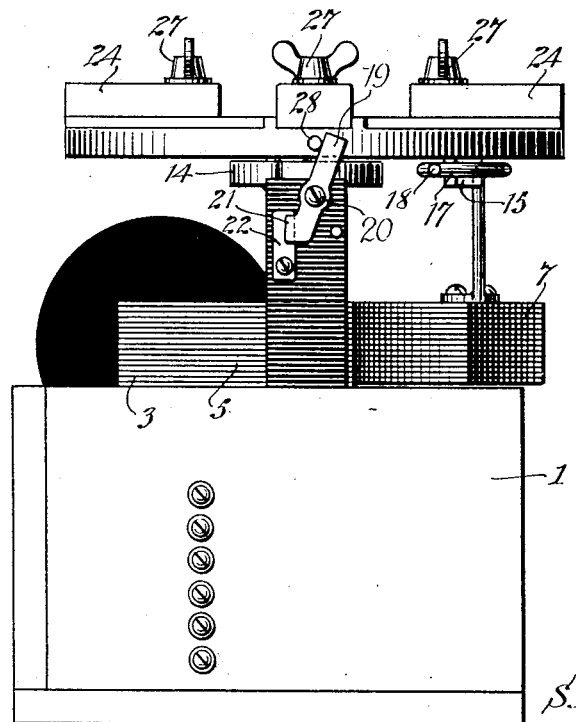
WITNESSES
Edw. Thorpe
A. L. Kitchin
INVENTOR
S. H. Sharpsteen
BY
Munn & Co
ATTORNEYS

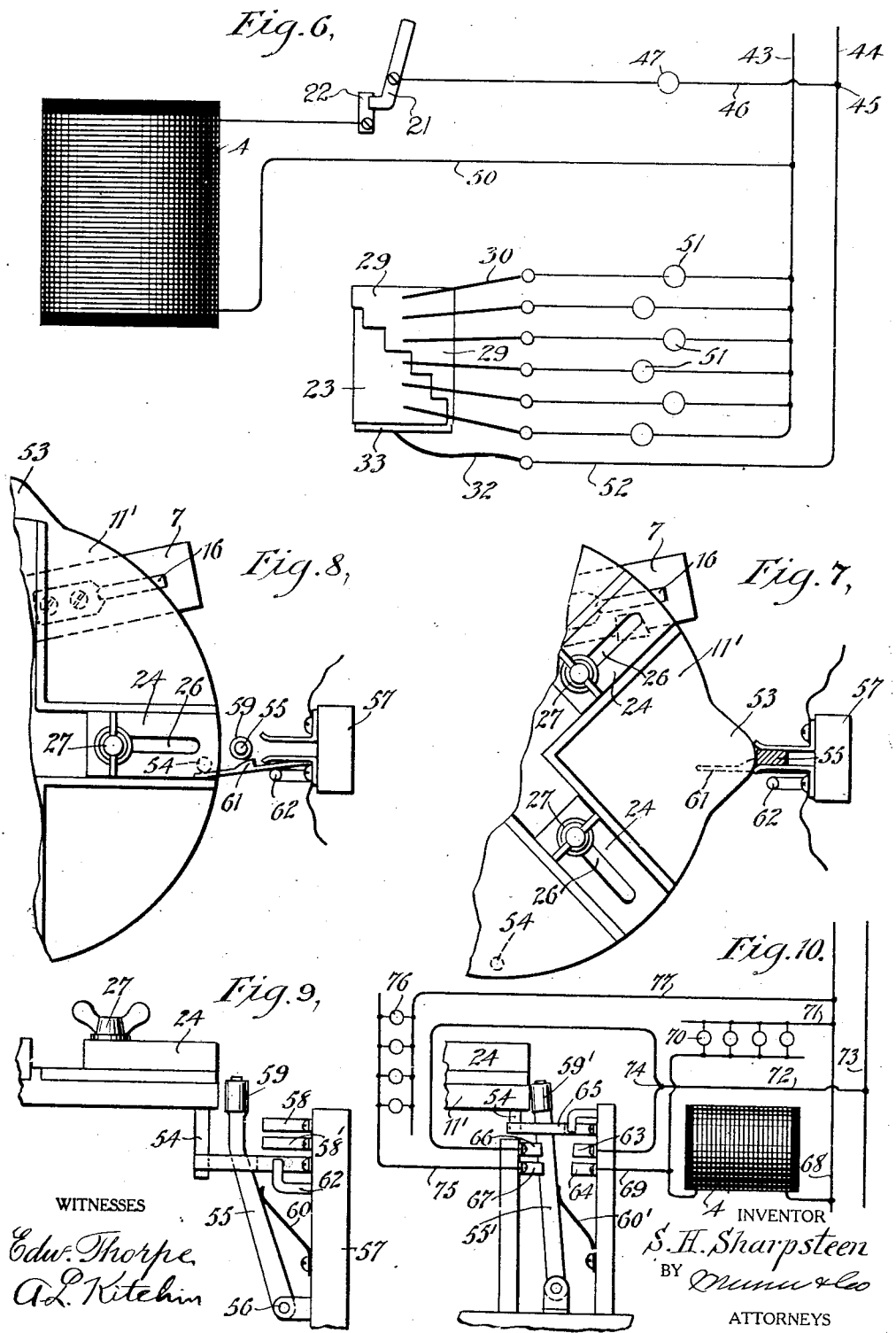

Patented May 21, 1929.

1,714,321

UNITED STATES PATENT OFFICE.

STEPHEN H. SHARPSTEEN, OF TENAFLY, NEW JERSEY, ASSIGNOR TO INTERNATIONAL ELECTRICAL ENGINEERS INCORPORATED, OF NEW YORK, N. Y., A CORPORATION OF NEW YORK.

MOTOR AND MOTOR SWITCH FOR FLASHERS AND THE LIKE.

Application filed October 28, 1924, Serial No. 746,439. Renewed October 6, 1928.

This invention relates to electric appliances and particularly to motors and motor switches for different electric devices such as flashers for signs and the like and has for an object to provide a construction which is simple but effective, the same being formed to use a minimum amount of current.

Another object of the invention is to provide a slow moving motor.

A further object of the invention is to provide a flasher with a motor and controlling means so constructed and arranged as to be readily adjusted for causing the motor and flasher to move at different speeds.

A still further object of the invention is to provide a flasher with an improved form of switch drum wherein the structure is such that the circuit is open when the switch brushes move off the contact.

In the accompanying drawings—

Figure 3 is a fragmentary horizontal sectional view through Figure 2, the same being taken on line 3—3.

Figure 4 is a fragmentary sectional view through Figure 2, the same being taken on line 4—4.

Figure 5 is an end view of the structure shown in Figure 1.

Figure 6 is a diagram showing the circuit of the structure shown in Figure 1.

Figure 7 is a detail fragmentary top plan view of a slightly modified form of switch mechanism to that shown in Figures 1 and 5.

Figure 8 is a view similar to Figure 7 but showing the parts in an advanced position.

Figure 9 is a side view of the structure shown in Figure 7.

Figure 10 is a view similar to Figure 9 but showing a modified form of the invention and a double arrangement of circuits.

Figure 1:
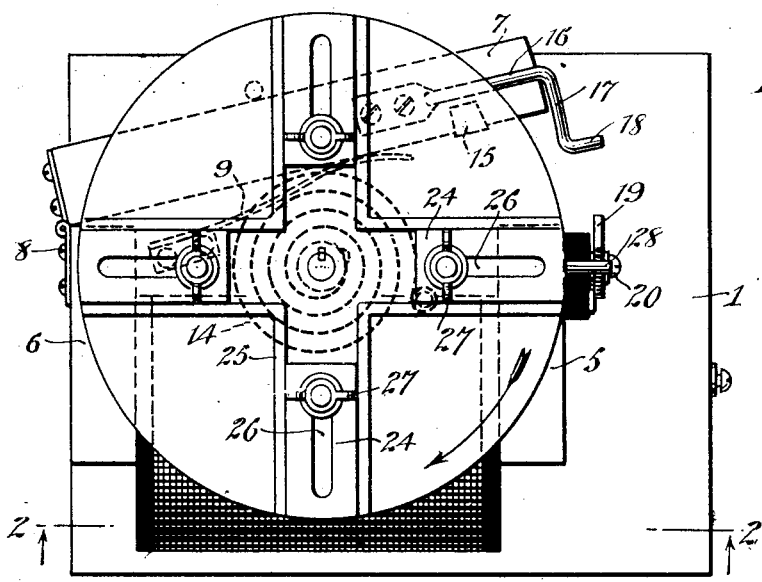
Figure 1 is a top plan view of a motor, motor switch and flasher, disclosing an embodiment of the invention.
Figure 2:
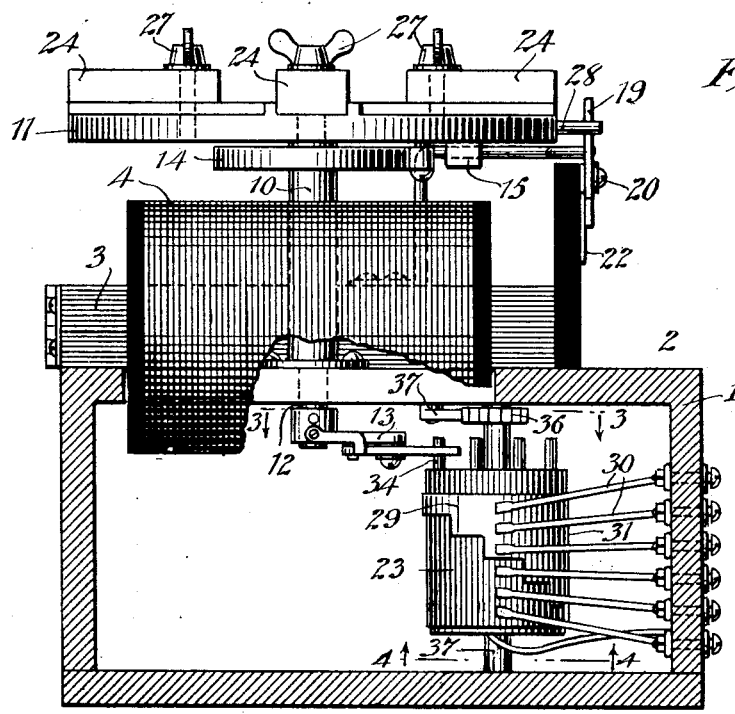
Figure 2 is a sectional view through Figure 1, approximately on line 2—2.

Referring to the accompanying drawings by numerals, 1 indicates a box or housing adapted to enclose certain parts of the device as shown in Figure 2, the top 2 acting as a base for supporting the core 3 on which the spool 4 is mounted. The core 3 is provided with polar extensions 5 and 6 co-acting with the armature 7, which armature is hingedly connected to pole 6 by a suitable hinge member 8. A spring 9 continually acts on the armature 7 to move the same to an outer position as shown in Figure 1 whenever the spool or winding 4 is deprived of current. Positioned adjacent the spool 4 is a hollow standard 10 secured to the base 2 by screws or other means as shown in Figure 2, said hollow standard acting as a support for the disk 11 and as a guide for the shaft 12, which shaft is rigidly secured at one end to the disk 11 and at the other to the arm 13. A coil spring 14 is connected at one end to the stationary standard 10 and at the opposite end to the disk 11 whereby when said disk is rotating in one direction, said spring will be wound and will cause the disk to rotate in the opposite direction when permitted. Projecting from the lower surface of the disk 11 is a block 15, said block being either integral with the disk 11 or rigidly secured thereto in any desired manner. This block extends downward so as to be in the path of movement of the pusher rod 16 rigidly secured to the armature 7, said pusher rod having a forwardly extending section 17 and an offset end 18. When current is supplied to the spool 4, the armature 7 will be immediately attracted and, consequently, the pusher rod 16 will give the projection 15 a quick push or blow. This push or blow will cause the disk 11 to rotate in the direction of the arrow shown in Figure 1. The armature 7 will continue to move toward the extension 5 until the extension 18 strikes the switch arm 19 and moves the same on its pivot 20 until the switch blade 21 moves off the contact plate 22 (Figure 5). As soon as this occurs, the winding of spool 4 will be deprived of current and spring 9 will then function to move the parts back to their former position. Notwithstanding the backward movement of the armature 7, the disk 11 will continue to move as indicated by the arrow in Figure 1 until the spring 14 is brought under sufficient tension to stop the same, after which, the spring will cause the disk to rotate in a reverse direction and again assume the position shown in Figure 1 with the projection 15 against the bar 16. As the disk 11 is moved as just described, the shaft 12 will be correspondingly moved for swinging the arm 13 back and forth the prescribed distance. The movement of the arm 13 back and forth will cause the drum 23 to rotate intermittently as hereinafter fully described.

In order to vary or regulate the speed of the disk 11 with a given amount of current consumption, a number of weights 24 are arranged on top of the disk, there being four shown, though a greater or less number might be used. These weights are positioned between guiding walls 25 connected with the disk in any desired manner. Each of the weights is provided with a slot 26 through which a clamping screw 27 extends. Each of the clamping screws act to clamp the weights in different adjusted positions, said weights being movable toward and from the center of the disk when the set screws are loose. In order that the disk may move at a comparatively high rate of speed, the weights may be moved radially inwardly to a central point. As they are readjusted and moved outwardly, the speed of the disk decreases. In case the weights in a given machine should not be sufficiently heavy to reduce the speed properly, additional weights may be added until the desired object has been secured.

It will be noted that the disk 11 also carries a pin or stop 28, which pin or stop is above the bar 16. After the armature has swung the disk in one direction, the spring 14 will move the same in the opposite direction until the pin 28 strikes the arm 19 and swings the same to the position shown in Figure 5. This takes place at the same time that the projection 15 moves into contact with the bar 16. As soon as the switch 21 has been moved to the position shown in Figure 5, current is again turned on and armature 7 is again moved for again swinging the disk 11. By having the projection 18 strike the arm 19 and move the switch blade 21 off of contact 22, current is only used for a minimum time as it is switched off during most of the movement of the disk 11 in both directions.

Referring more particularly to the drum 23, it will be noticed that the same is provided with an insulated body or covering to which a contact plate 29 is secured, said contact plate being notched or offset as shown in Figure 2 so that the various brushes 30 will move onto the plate 29 in succession. The plate 29, however, has the rear edge 31 arranged substantially in a straight line so that all of the brushes 30 will be moved off of the same at the same time. In order to eliminate sparking as the brushes move off of the contact 29, a special switch has been provided, the same being shown more particularly in Figure 4. As indicated in this figure, the switch consists of a resilient contact arm 32 adapted to be brought into contact with the contact plate 33 and with the section of insulation 34 at different times. From this figure it will also be noted that the edge 31 overlaps the section 34 so that the current is broken between contact plate 33 and arm 32 before the respective brushes 30 move over the edge 31. It will, therefore, be observed that there will be no spark whatever as the brushes 30 leave the plate 29. In order that the sparking between the brush 32 and plate 33 shall be reduced to a minimum, the drum is given a quick movement for causing the contact plate 33 to quickly leave the brush 32 and, consequently, produce a minimum spark. The same thing is true of the way the drum acts in respect to the brushes 30, namely, a quick movement is provided for causing the brushes to move onto the contact plate 29. This is caused by the arm 13 and associated parts co-acting with the various pins 34 extending from one end of the drum 23.

As indicated in Figure 3, there are provided eight pins 34 but it is evident that a greater or less number might be used. A notched wheel 36 is connected to the shaft 37, which shaft is rigidly secured to the drum 23 and which is also suitably supported by any desired kind of bearings. A spring pressed pawl 36′ acts to hold the drum against accidental rotation for permitting the same to rotate whenever positively actuated. The arm 13 as shown in Figure 3, carries a striking finger 39 which is pivotally mounted at 40 on arm 13. An extension 41 projects from the finger 39 and co-acts with the pin 42 mounted on the arm 13. The extension 41 is normally held in contact with the pin 42 by a suitable spring so that the parts will normally assume the position shown in Figure 3. On the return movement of the disk 11 after the same has been actuated by the armature 7, the finger 39 will strike one of the pins 34 and will move the drum 23 one-eighth of a revolution according to the showing in the drawing. If a different number of pins are used, the movement would be, of course, correspondingly greater or less according to the number of pins used. It will also be noted that the movement of the drum 23 by the finger 39 is a comparatively quick movement and, consequently, the plate 29 will move under one of the brushes 30. On the next movement, the plate 29 will move under another brush until all of the brushes have engaged the plate. If desired, the plates could be made of such a length that the brushes 30 would all remain in contact with the plate for several movements of the drum and then finally move off the edge 31, after which, the action would be repeated. The parts are so proportioned that on the last movement of the drum before the plate 29 moves from beneath the brushes 30, the contact plate 33 (Figure 4) will move away from the contact arm 32 so as to break the circuit of all the brushes 30 immediately before they pass over the edge 31. It will thus be seen that as the brushes 30 move off of plate 29, there will be no sparking as there will be no current on the brushes and as the plate 29 moves under the brushes by a quick movement the sparking will be very small.

In Figure 6, a diagram is shown illustrating the circuit used in connection with the structure shown in Figures 1 and 2. From this diagram it will be observed that current is supplied by suitable supply wires 43 and 44. Starting with the connection 45, current will pass through the wire 46, lamp 47, switch blade 21, contact plate 22, winding of the spool 4 and wire 50 back to the wire 43. In this circuit, lamp 47 acts in the double capacity of a flashing lamp and also as a resistance to cut down the voltage and current supplied to the windings of spool 4. As heretofore described and shown particularly in Figures 2 and 3, the motor of which the spool 4 is part, causes the drum 29 to rotate and, consequently, causes the current to be turned onto the various lamps 51. When the device is in operation, current is taken off of the wire 44 and passes through the wire 52, contact brush 32, contact 33, plate 29 and all of the brushes 30 which may be in engagement therewith. From the brushes 30 the current passes through the respective lamps 51 back to the wire 43. It is intended that the lamp 47 should act as a resistance for the spool 4 and also as a flashing lamp to be used as part of a sign so as to intermittently illuminate a word or picture. The various lamps 51 are intended to be lighted successively as the drum 23 rotates and thereby successively illuminate letters, words or other things on a sign.

In Figures 7 to 9 inclusive, a slightly modified construction is shown wherein the disk 11 and the switch operated thereby are constructed in a different manner from that shown in Figure 1. Referring more particularly to these figures, 11' indicates the disk which is provided with a cam 53 and a projection or stop 54. Instead of using the switch arm 19 and associated parts as shown in Figures 1, 2 and 3, a switch blade 55 is provided pivotally mounted at 56 on a suitable standard 57, which standard carries a pair of switch jaws 58 and 58' for receiving the switch blade 55. This blade carries a roller 59 which is adapted to be engaged by the cam 53 for swinging the blade 55 against the action of spring 60 until the blade 55 assumes the position shown in Figure 7. As the cam 53 moves the blade 55 into the position shown in Figure 7, a spring catch 61 will snap into position and prevent the switch blade from moving back to its former position. The circuit will be maintained closed until the projection or pin 54 strikes the extension of the catch 61 and swings the same to one side whereupon the spring 60 will begin to function and again force the switch blade 55 outwardly until the roller 59 is almost in engagement with the disk 11'. It will be noted from the drawing that the pin or projection 54 is positioned ninety degrees from the cam 53 and, consequently, the disk 11' must rotate three-fourths of a turn before the pin 54 can strike the extension of catch 61 and move the same to the position shown in Figure 8. A stop 62 prevents the catch 61 from swinging beyond a certain distance and also acts to cause the catch to become an abutment and prevent the pin 54 and disk 11' from rotating further than the position shown in Figure 8. In this manner, the disk is positively stopped and then the spring 14 is permitted to function to cause the disk to rotate back again to the position shown in Figure 7. At the same time that the cam 53 reaches the position shown in Figure 7, the projection or stop 15 will strike the bar 16 and the disk will be prevented any further movement in that direction. Also, as soon as the parts reach the position shown in Figure 7, the circuit is closed for the electric motor shown in Figures 1 and 2 and the armature 7 will again begin to function.

In Figure 10, a further modified form of the invention is shown wherein a plurality of sets of lamps are supplied with current at spaced intervals. In this form of the invention, the disk 11' is used and acts on the roller 59' to swing the switch blades 55' into engagement with the respective switch jaws 63 and 64. A spring catch 65 similar to the spring catch 61, catches and holds the switch blade in its closed position until the pin 54 strikes the catch 65 as illustrated in Figure 8. As soon as the switch blade 55' has been released, spring 60' will immediately force the same over to the position shown in Figure 10 whereupon the switch blade connects the switch jaws 66 and 67. In this form of the invention the spool 4 is connected to a supply wire 68 and to the wire 69, which wire at one end is connected to the socket 64 and at the other to the various lamps 70. The opposite side of the lamps 70 is connected to the supply wire 68 by wire 71. A feed wire 72 is connected to the supply wire 73, said feed wire being divided at 74 so that one branch is connected to the socket 63 and the opposite branch to the socket 66. A wire 75 is connected to the socket 67 and to one side of the lamps 76, the opposite side of said lamps being connected with wire 77, which wire is also connected with the supply wire 68.

When the parts are in the position shown in Figure 10, current will pass from wire 73, to wire 72, point 74 and one branch of wire 72 to socket 66, through switch blade 55', socket 67, wire 75, lamps 76 and wire 77 to the supply wire 68. When the cam 53 moves the switch blade 55' over into engagement with the switch jaws 63 and 64, current will pass from wire 72 to jaw 63, through blade 55', jaw 64, wire 69, lamps 70 and wire 71 to the supply wire 68. It will thus be seen that the winding of spool 54 is directly across the wires 68 and 73 and also the various lamps 70 and 76 are directly across these wires. It is to be understood that the form of switch shown in Figure 10 could be used in connection with the structure shown in Figures 1 and 2 without departing from the spirit of the invention. It is also understood that the switch shown in Figure 7 could be used with the structure shown in Figure 1.

What I claim is:

1. An electric motor including an electromagnetic member, an armature actuated by said electromagnetic member, a rotatable disk moved in one direction by said armature, a spring for moving said disk in the opposite direction, means extending from said armature for opening the switch of said electromagnetic means, and means extending from said disk for closing said switch.

2. An electric motor, comprising an electromagnetic member, a switch for controlling current thereto, a rotatable disk mounted near said electromagnetic member and said switch, means actuated by said electromagnetic member for rotating said disk, in one direction, a spring for rotating said disk in the opposite direction, and means carried by the first mentioned means for intermittently opening said switch, and means carried by said disk for closing said switch.

3. An electric motor, including a swinging member, a switch for said electric motor, means operated by said swinging member for opening said switch, a rotatable disk rotated by said swinging member in one direction, a spring for rotating said disk in the opposite direction, and means extending from the disk for closing said switch.

4. An electric motor including a switch, an electromagnetically operated member having a movable armature, a disk rotated by said armature, means carried by the armature and the disk for automatically opening and closing said switch, adjustable weights mounted on the disk for varying the speed thereof, and a spring for moving said disk in the opposite direction to said armature.

5. An electric motor, comprising a magnetic member, an armature actuated thereby, a pusher bar extending from said armature, a switch arranged in the path of movement of said pusher bar whereby the same is moved to an open position when the armature has been attracted and moved a certain distance by said magnetic member, a rotatable disk provided with a projection arranged in the path of movement of said bar whereby when the bar and armature are moved the disk will be moved in one direction, a spring acting on said disk for moving the disk in the opposite direction, and means projecting from the disk for engaging and closing said switch when the disk is moved back to its first position.

6. A motor comprising a rotary disk, means operable to rotate said disk alternately in opposite directions, said means including a swinging armature, an abutment carried by the disk and adapted to be struck by said swinging armature for rotating the disk in one direction, and a spring for causing the rotation of the disk in the opposite direction, a normally closed electric switch, means operable on rotation of the disk in one direction to open said switch, and on rotation in the opposite direction to again close said switch, and means for regulating the rotational speed of said disk.

7. An electric motor, including an electromagnetic member, a hingedly mounted armature actuated by said electromagnetic member, a rotatable disk means extending from the armature for transmitting movement in one direction to said disk, means for moving said disk in the opposite direction, a switch for controlling the current to said electro magnetic member, means operating in one direction by said armature for opening said switch and means operated by said disk for closing said switch.

8. An electric motor, including an electromagnetic member, a hingedly mounted armature actuated by said electromagnetic member, a rotatable disk moved in one direction by said armature, a spring for moving said disk in the opposite direction, a switch for controlling the current to said electromagnetic member, means extending from said armature for opening said switch, means extending from said disk for closing said switch, said closing means functioning to close said switch as the disk completes its movement under the action of said spring, said means for opening said switch being positioned to open the switch immediately after said armature has been actuated whereby the electromagnetic member is deprived of current for most of the time that said disk is moving.

STEPHEN H. SHARPSTEEN.